United States Patent
Lou et al.

(10) Patent No.: US 10,166,889 B1
(45) Date of Patent: Jan. 1, 2019

(54) SERIES MOUNTED ENERGY ATTENUATOR AND SPRING DAMPER

(71) Applicant: Armorworks Holdings, Inc., Chandler, AZ (US)

(72) Inventors: Ken-An Lou, Phoenix, AZ (US); David A. Bosen, Tempe, AZ (US); Valent Horvatich, Scottsdale, AZ (US)

(73) Assignee: Armorworks Holdings, Inc., Chandler, AZ (US)

( * ) Notice: Subject to any disclaimer, the term of this patent is extended or adjusted under 35 U.S.C. 154(b) by 75 days.

(21) Appl. No.: 15/483,985

(22) Filed: Apr. 10, 2017

(51) Int. Cl.
| | |
|---|---|
| *B60N 2/42* | (2006.01) |
| *B60N 2/427* | (2006.01) |
| *B63B 29/04* | (2006.01) |
| *B64D 11/06* | (2006.01) |

(52) U.S. Cl.
CPC ........... *B60N 2/427* (2013.01); *B60N 2/4242* (2013.01); *B63B 29/04* (2013.01); *B63B 2029/043* (2013.01); *B64D 11/0619* (2014.12)

(58) Field of Classification Search
CPC ........ B60N 2/427; B60N 2/4242; B60N 2/02; B60N 2/52; B60N 2/50; B63B 29/04; B63B 2029/043; B64D 11/0619
USPC ...... 188/266, 267.1, 267.2, 322.19; 267/132, 267/133, 130, 216.15–216.19, 216.2
See application file for complete search history.

(56) References Cited

U.S. PATENT DOCUMENTS

| | | | | |
|---|---|---|---|---|
| 4,093,197 A | * | 6/1978 | Carter | A47C 3/025 267/131 |
| 5,911,191 A | | 6/1999 | Burer | |
| 6,120,082 A | * | 9/2000 | Vandermolen | B60N 2/02 248/550 |
| 6,880,483 B2 | | 4/2005 | Fedders | |
| 7,549,387 B2 | | 6/2009 | Funk | |
| 7,921,973 B2 | | 4/2011 | Wereley et al. | |
| 7,950,618 B1 | | 5/2011 | Burer | |

(Continued)

OTHER PUBLICATIONS

Christopher Liam, Testing and Modeling of Shock Mitigating Seats for High Speed Craft, Masters Thesis, Virginia Polytechnic Institute and State University, Blacksburg, Virginia, May 6, 2011, IP Address: https://vtechworks.lib.vt.edu/bitstream/handle/10919/32874/LIAM_CC_T_2011.pdf?sequence=1&isAllowed=y.

*Primary Examiner* — Pamela Rodriguez
(74) *Attorney, Agent, or Firm* — James L Farmer

(57) ABSTRACT

Methods and apparatus are provided for a shock absorbing vehicle seating system. In one embodiment the seating system includes a seat moveably attached to a vehicle by a seat guide apparatus configured to constrain seat movement to a stroking direction. The system further includes a spring damper with opposed first and second ends, configured to compress along a longitudinal axis extending through the ends in response to an external compressive load, and an energy attenuating component with a deformable portion disposed between a first end and a second end thereof. The spring damper and energy attenuating component are arranged serially with respect to one another, and together form a seat supporting assembly disposed between the seat and the vehicle. The energy attenuating component is configured to deform in a predictable manner in response to a shock load that reaches a predefined threshold value, allowing the seat to stroke in the stroking direction as the energy attenuating component absorbs energy.

18 Claims, 3 Drawing Sheets

(56) References Cited

U.S. PATENT DOCUMENTS

| | | | | |
|---|---|---|---|---|
| 8,118,287 B2 * | 2/2012 | Schordine | ............. | B60N 2/502 |
| | | | | 248/241 |
| D657,312 S * | 4/2012 | Aragon | ....................... | D13/118 |
| 8,678,465 B1 * | 3/2014 | Aragon | ................... | B60N 2/24 |
| | | | | 244/122 R |
| 9,327,623 B2 | 5/2016 | Olivares | | |

* cited by examiner

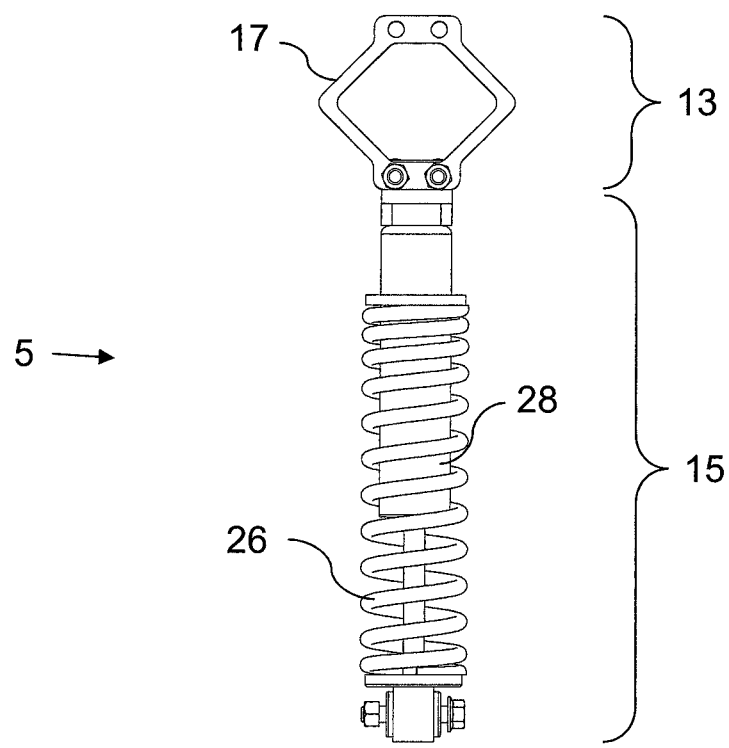
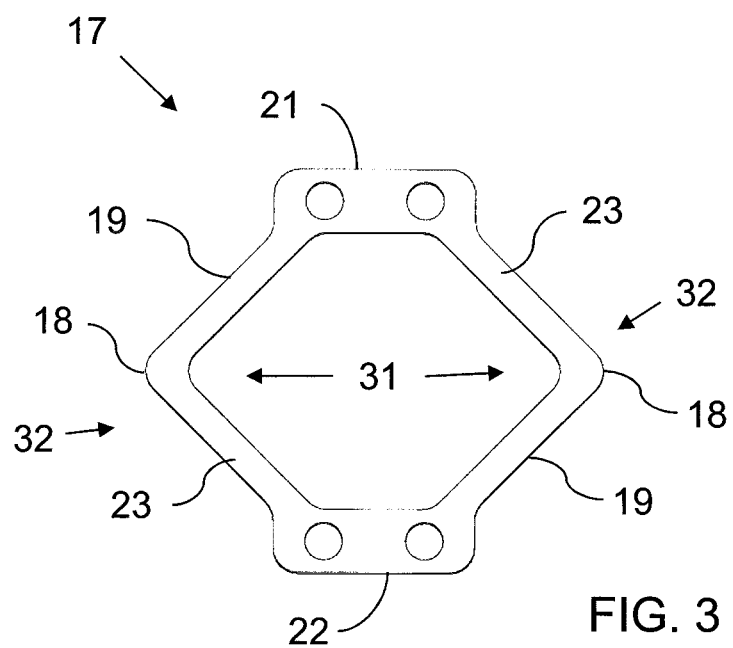

SERIES MOUNTED ENERGY ATTENUATOR AND SPRING DAMPER

TECHNICAL FIELD AND BACKGROUND

The technical field of the present invention relates to energy attenuation technology for reducing the severity of shock loads experienced by vehicle occupants during high energy impact events, and to the incorporation of such technology in land vehicle, watercraft, and aircraft seating systems.

BRIEF DESCRIPTION OF THE DRAWINGS

In the accompanying drawings:

FIG. 2 is a front view of an exemplary seat support assembly comprising an energy attenuator and spring damper in series arrangement;

FIG. 3 is a front view of an exemplary deformable energy attenuator portion of the seat support assembly of FIG. 2;

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
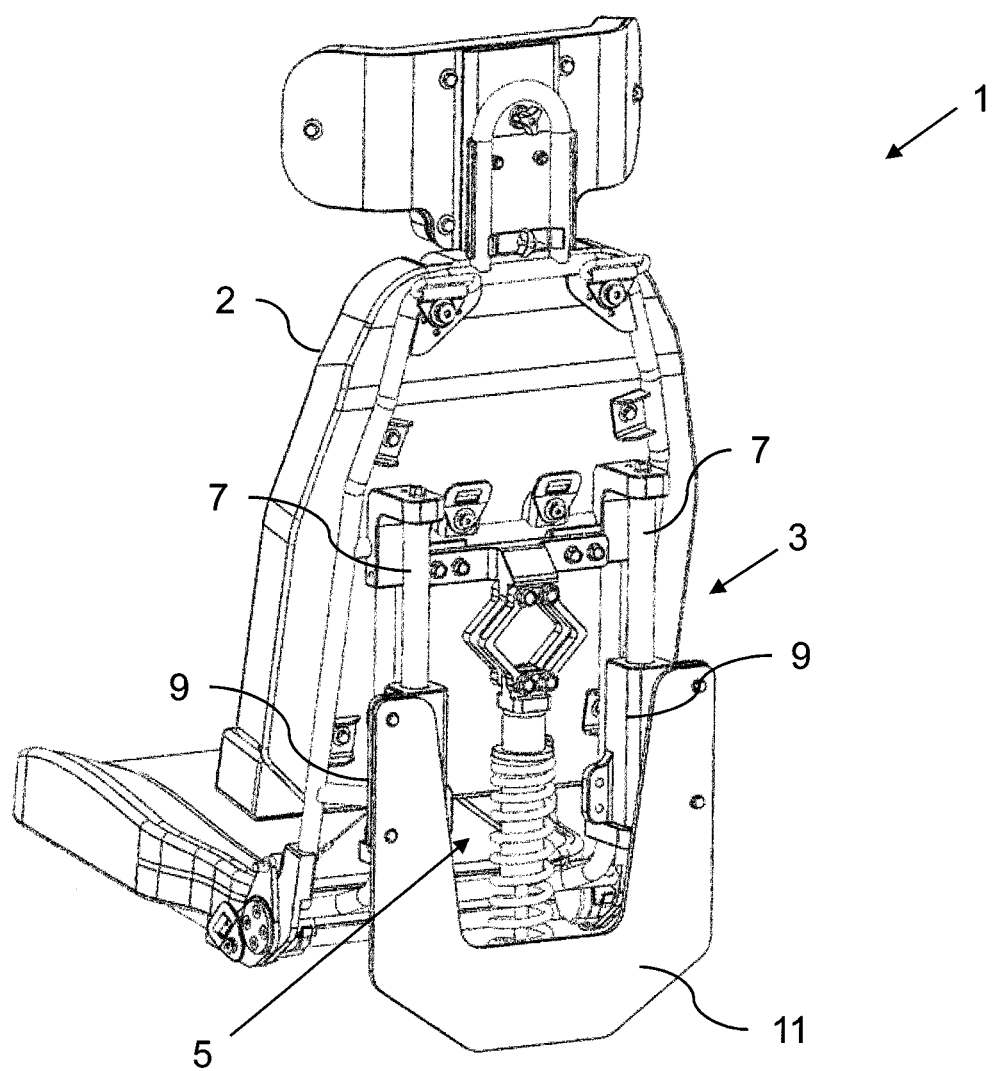
FIG. 1 is a back perspective view of an exemplary seating system and seat support assembly in accordance with the present disclosure.

An exemplary shock absorbing and energy attenuating seating system in accordance with the present disclosure is indicated generally at reference numeral 1 in the drawing Figures. Referring initially to FIGS. 1 and 2, the seating system comprises a vehicle seat 2, a seat guide apparatus 3, and a seat support assembly 5. The seat guide apparatus 3 is configured to attach the seat 2 to a vehicle compartment structure, such as a side wall or floor, while allowing the seat to freely move (or stroke) in a substantially linear direction. The seat is prevented from moving, or simply falling by seat support assembly 5, which serves to support the seat, and to control or modulate inertia-caused motion (or "deflection") of the seat, both in normal vehicle operation and during a high energy impact event.

The seat guide apparatus 3 may be any type of mechanism that secures the seat to the vehicle while constraining seat motion to a substantially linear path. In the depicted embodiment for example, left and right parallel bars 7 attached to the back of the seat are slidably received in fixed guide blocks 9. The guide blocks 9 may be directly bolted to the vehicle compartment, or indirectly attached such as through the mounting plate 11 shown. The guide blocks 9 are essentially elongated bushings, or alternatively a pair of separate, spaced apart bushings, where the difference between the length of the blocks and the length of the bars 7 defines the maximum seat stroking distance. The length of blocks 9 (or spacing if a separate bushings) is also selected to reduce or minimize binding when reacting torque loads applied by the seat via bars 7. When installed in a vehicle, the bars 7 and seat 2 move together as the bars slide through the guide blocks 9, and the seat translates along the defined path.

The orientation of guide blocks 9 determines the direction of the sliding motion, and in the case of generally vertically directed threats such as an explosion under a land vehicle or an aircraft slam down event, the guide blocks may be oriented to produce a substantially vertical path. It should be appreciated however that other bracket orientations and seat motion directions may be preferable in other circumstances or for certain types of vehicles.

In addition, various other configurations for producing guided seat motion are possible and considered to be equivalents of guide apparatus 3 within the scope of the present disclosure. For example, in another sliding type embodiment, the bars and guide blocks may be reversed, with bushings attached to the seat, and guide bars fixed to the vehicle compartment. Various sliding arrangements of this type are disclosed in U.S. Pat. Nos. 8,678,465, 8,550,553, and 9,132,753, all of which are assigned to the assignee of the present disclosure, and all hereby incorporated by reference.

In another embodiment, guided motion is produced by a linkage arrangement connecting the seat to the vehicle compartment so that the seat essentially swings instead of sliding. One such example is disclosed in U.S. patent application Ser. No. 15/276,413, which is also assigned to the assignee of the present disclosure, and hereby incorporated by reference. This patent application discloses a seat supported by left and right pairs of pivoting arms in a configuration similar to the well-known double wishbone design used in automobile suspensions. The disclosed linkage is configured such that the seat moves by translating without rotating along a substantially vertical path.

Under normal conditions, or in other words in the absence of the type of catastrophic vertical acceleration associated with an under-vehicle explosion or an aircraft slam down (generally "impact event"), the seat is held in place and prevented from simply sliding downward by the seat support assembly 5. The seat support assembly 5 is disposed between the seat and the vehicle, and comprises two elements arranged in series, specifically a plastically deformable energy attenuating ("EA") component 13, and a spring damper, or strut 15 (see FIG. 2). In the depicted embodiment the EA component 13 sits atop the spring damper, however the positions may be reversed with the spring damper atop the EA component. In addition, although one seat support assembly 5 is shown, an equivalent seating system may utilize two or more of the support assemblies instead.

The EA component 13 may comprise a crushable or extensible metal construction that is rigid and strong enough to support the weight and G-loads of an occupied seat while the load is below a predetermined threshold value, yet capable of deforming in a controlled manner and absorbing the energy of an impact event that produces shock loads at or above the threshold value. The EA component 13 attenuates energy through plastic (or permanent) deformation of the metal, and may comprise any generally rigid, non-brittle metal, such as brass, aluminum, steel, or alloys thereof. For example in one particular embodiment the EA component is made of a high strength aluminum alloy such as 6061-T6.

The depicted EA component 13 comprises a pair of adjacent deformable members 17 in a symmetrical arrangement atop the spring damper 15. Referring to FIG. 3, the deformable members 17 each comprise upper and lower flanges 21, 22, integrally formed with a pair of bookmatched elongated metal bars 23. The bars 23 are formed in a sideways letter "V" shape, with straight sections 19 extending from angle bends 18 at the middle of each bar (see FIG. 3), thereby defining an acute angle side 31 and an obtuse angle side 32. The upper flanges 21 are configured for rigid attachment to the seat, and the lower flanges 22 are configured for rigid attachment to an upper end of spring damper 15. In addition flanges 21 and 22 provide a moment restraint, preventing the ends of the deformable members from rotating during an impact event as the EA component is crushed, and forcing substantially all of the deformation to occur within the metal bars 23. For example, in the depicted embodiment the rigid attachment is by means of a pair of spaced apart bolts at each flange 21, 22.

The EA component may be custom tailored to any particular application by modifying material properties, thicknesses, and/or shapes. In one exemplary implementation the EA component is configured to effectively attenuate road shock loads transmitted through a vehicle chassis structure of at least 10 G's vertical, while supporting a $95^{th}$ weight percentile seat occupant.

Additional suitable EA component and "EA link" embodiments are disclosed for example in U.S. Pat. Nos. 7,938,485, 8,403,410, 8,678,465, and D657,312, all of which are assigned to the assignee of the instant invention, and hereby incorporated by reference. Alternatively, the EA component may comprise any other crushable or extensible EA structure known in the art, such as crush tubes, inversion tubes, metal shearing or tearing devices, and the like. Although deformable EA devices such as EA component 13 may be configured to protect a seated occupant for multiple impact events, they are generally considered disposable and easily replaced to restore a maximum level of protection.

The spring damper 15 may comprise any component or combination of components that provide a spring force and damping. For example in one embodiment the spring damper is simply a mass of a viscoelastic material such as neoprene synthetic rubber. In another embodiment the spring damper is any of various conventional, commercially available struts made for use in cars, off-road vehicles, aircraft, motorcycles, bicycles, and the like. A function of the spring damper is to enhance seat occupant comfort throughout the range of normal vehicle operation by providing compliance in the seat mounting configured to minimize the transmission of road shocks and vibration to the seat.

Referring again to FIG. 2, the depicted spring damper consists of a spring 26 and damper 28 that together with the combined mass of the seat and occupant comprise a tuneable spring-mass-damper system. The spring may be an external "coil over" type as shown, or other configurations such as internally sprung, or a separate independent spring. The spring 26 (or the spring rate of a viscoelastic material or other spring embodiment) largely determines the amount of compliance in the seat mounting, and serves to support the static weight of the seat and occupant, along with any gear or equipment carried by the occupant. In one embodiment the spring is configured to have sufficient stiffness to limit static deflection of an occupied seat to a predefined maximum static deflection amount.

Normal Operating Conditions

In addition to supporting the static loads, the spring 26 is tuned in conjunction with the damper 28 to give a suitable damped response for a range of anticipated dynamic loading conditions associated with normal vehicle operation. The spring damper loads resulting from tuning the spring damper to produce a desired response or comfort level during normal vehicle operating conditions are, by definition, less than the threshold load of the EA component 13. Accordingly during normal vehicle operation, the EA component remains rigid, and any deflection of the seat occurs exclusively in spring damper. It should be appreciated that tuning of the spring and damper refers primarily to varying the stiffness of the spring 26 in terms of its spring rate, and varying the force-velocity response of the damper 28 in terms of a damping coefficient, to produce a desired dynamic reaction. The dynamic loading conditions considered for normal operating conditions may be in the form of step accelerations, such as might occur when the vehicle receives sudden unexpected jolt, as well as continuous, relatively lower frequency road-induced vibrations transmitted to the seat.

For step accelerations occurring during normal vehicle operation, the spring and damper may be tuned to react with enough resistance to prevent excessive deflection or bottoming out of the spring damper, while also preventing subsequent oscillations (at least critical damping). In the present seating system, a step acceleration may result from a sudden upward acceleration of the vehicle body relative to the seat, such as when the vehicle hits a speed bump; or conversely when the vehicle and seat are moving downward, and the downward vehicle motion is suddenly stopped, such as when the wheels hit the bottom of a hole or ditch.

The spring damper may be further tuned to act as a vibration isolator with respect to certain vibration frequency ranges transmitted from the ground to the vehicle and seat mounting. The effects of vehicle produced low frequency vibration on the human body are well documented. Various guidelines and regulations have been promulgated for use by industry, such as ISO 2631-1:1997 and ISO 2631-5:2004 which relate to the evaluation of human exposure to whole body vibration, or "WBV". For example, ISO2631-5 provides recommendations with respect to vibration effects on the human body evaluated by compression stress in the lumbar spine. The recommendations specify acceptable levels of frequency-weighted spinal stress in terms of a daily equivalent static stress.

Moreover, the use of passive spring and damper supported seats for vibration isolation is well known, with published standards defining test procedures and acceptance criteria. For example, ISO 5007 specifies a laboratory method for measuring and evaluating the effectiveness of the suspension of operator seats on agricultural wheeled tractors for whole body vibration transmitted to the operator at frequencies of from 1 Hz to 20 Hz.

With respect to the present seating system, the spring damper may be configured to act as an isolator for an anticipated input vibration frequency range, meaning the resulting seat vibration amplitude is less than the amplitude of the input vehicle vibration. The seat and spring damper may be viewed as a single degree of freedom (or SDOF) system, with a natural frequency $f_n$ which can be approximated by:

$$f_n = 3.13\sqrt{k/W} \quad [1]$$

Where 'k' is the spring rate of the spring 26 in lbs./in., and "W" is the combined weight of the seat 2 and occupant in lbs. In such a system, isolation is achieved when the ratio of the input forcing frequency $f_f$ to the system natural frequency is given by:

$$\frac{f_f}{f_n} > \sqrt{2} \quad [2]$$

or rearranging in terms of the maximum natural frequency:

$$f_n < f_f/\sqrt{2} \quad [3]$$

In one embodiment, the spring is tuned to give a system natural frequency that results in isolation at or above a pre-defined road-induced forcing frequency level. For example, to ensure isolation is occurring at a predefined, or anticipated road-induced input frequency of 2.5 Hz., from equation 3 above the system natural frequency must not exceed 2.5/√2, or 1.8 Hz. Then taking an assumed combined weight of 250 pounds for the seat and occupant, the spring rate of the spring damper (from equation 1 rearranged) must not exceed 250×(1.8/3.13)², or 83 lbs/in.

Depending on the frequency range of the anticipated input vibration, ensuring isolation may in some cases result in an overly soft spring, and undesirable bottoming out during normal operation. However, increasing spring stiffness to a suitable value may result in a resonant condition within the input vibration frequency range, and possible amplification of the input vibration. In such a case rather than avoiding an amplification condition, damping may be selectively used to reduce or prevent amplification at the desired increased spring rate.

Maximum amplification occurs in a SDOF system at resonance, defined as a condition where the input forcing frequency $(f_f)$ and the system natural frequency $(f_n)$ are equal. For the relatively low frequency ranges of present concern, the maximum amplification factor 'Q' is given by:

$$Q = 1/(2\zeta) \quad [4]$$

where $\zeta$ is the damping ratio, defined as the ratio of the damping coefficient c to the critical damping coefficient $c_c$. When the value of Q is equal to or less than a value of one, there is no amplification of the input vibration amplitude at resonance. From equation 4, Q has a value of 1 when the damping coefficient $\zeta$ has a value of ½. Accordingly amplification may be avoided by providing enough viscous damping to give a damping ratio of at least ½.

The amount of viscous damping is defined by the damping coefficient c, and the relationship between viscous damping coefficient and damping ratio can be expressed as:

$$c = \frac{\sqrt{Wk}\,\zeta}{9.83} \quad [5]$$

Substituting the weight and spring rate values of 250 lbs. and 83 lb/in. from the above example, and the minimum damping ratio of ½, gives a damping coefficient c of 7.3. Thus the amplitude of the seat displacement will not exceed the input vibration displacement in the present example if the damping coefficient is at least 7.3.

However, when the damping ratio is less than 1, the system is underdamped, and will oscillate in response to a disturbance. To prevent oscillation, the damping ratio must have a value of at least 1, also known as critical damping. At critical damping, equation 4 then gives an amplification factor Q of 0.5, and because this is less than 1, there is again no amplification of the input vibration at resonance. Going back to the above example, and using the critical damping ratio of 1, equation 5 then gives a proportionate increase of the damping coefficient from 7.3 to 14.6. Thus the spring rate and damping coefficient may be selected to ensure an operating condition in which oscillatory behavior and amplification are minimized or prevented.

In addition to having a direct effect on the seat vibratory response during normal operating conditions, as discussed further below, the amount of damping also largely determines behavior and efficiency of the seat support assembly at very high velocities. While the spring stiffness generally affects only the normal vehicle operation regime, both normal operating conditions and high energy impact conditions are affected by the amount of viscous damping.

Impact Conditions:

During an impact event, accelerations outside the range of those associated with normal vehicle operation are imposed on the seat support assembly 5, and the resulting loads carried by the seat support assembly may reach the threshold value, initiating permanent deformation of the EA component. Because the EA component 13 and spring damper 15 are arranged serially, the spring damper carries the entire load along with the EA component, and must at some point generate a reaction force equal to the EA threshold value in order for the EA component to deform. As will be described further below, the system may be configured so that this condition occurs almost immediately after the onset of an impact event, when the combination of velocity induced damping force and spring force reach the threshold value.

A high energy impact event is typically described as a triangular impulse, or acceleration, increasing linearly from zero to a peak and back to zero within a matter of milliseconds. With respect to the present seating system, the practical effect is a near instantaneous step increase in the vehicle and seat closing velocity from zero to some peak value. In the case of an under-vehicle explosion event for example, the vehicle is instantaneously accelerated upward toward the seat to a peak velocity, delivering the triangular acceleration impulse to the seating system. Typical peak instantaneous closing velocities during such impact events may be in a range of about 150 to 400 inches per second.

Figure 4:
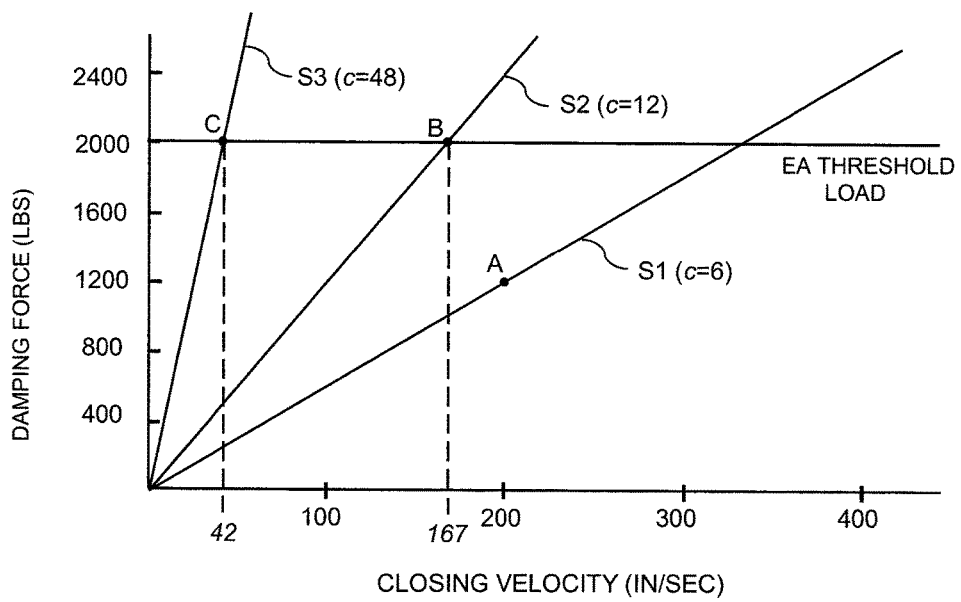
FIG. 4 is a graph illustrating the effect of damping coefficient on damping force at various vehicle to seat closing velocities associated with impact event conditions.

FIG. 4 depicts a series of dynamic spring damper reaction force plots, with lines S1, S2 and S3 corresponding to viscous damping coefficients C (ratio of damping force to velocity in units of lb-sec/in.) with values of 6, 12, and 48 respectively. The force values in FIG. 4 represent damping force only. True spring damper reaction force also includes spring force, however the spring force becomes relatively insignificant at the velocity and force levels associated with impact events, and for present purposes is ignored. The force lines S1 to S3 depict a linear force-velocity relationship, which is also a simplification, but sufficiently representative of typical manufacturer supplied dynamometer data for purposes of the present disclosure. In addition, only spring damper compression is shown in FIG. 4, instead of both compression and extension, as is typically displayed in manufacturer data.

A horizontal line in FIG. 4 indicates the maximum load possible in the seat support assembly 5, and corresponds to the EA threshold load. The 2000 lb. exemplary threshold load shown is typical, and derived from an assumed maximum allowable seat acceleration of 8 G's, and a combined seat and occupant weight of 250 lbs.

Certain characteristics of the seating system become apparent from an examination of FIG. 4. For example, at an assumed initial seat-vehicle closing velocity of 200 in/sec, line S1 gives a spring damper reaction force of 1,200 lbs, indicated at point "A". Because this is below the 2000 lb. threshold load, the EA component would remain rigid, and only the spring damper would compress and absorb energy until eventually bottoming out.

Figure 5:
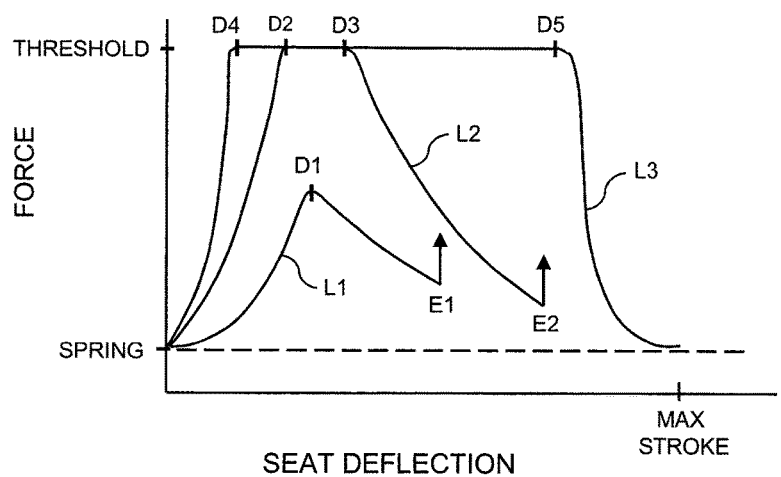
FIG. 5 is a force-deflection plot illustrating the effect of damping coefficient on energy attenuation efficiency at the impact event conditions of FIG. 4.

This type of spring damper behavior is shown graphically as line L1 in the force-displacement plot of FIG. 5. At the onset of the initial closing velocity, the force ramps up from a baseline spring force to the 1,200 lb. maximum load, indicted at point D1, and then progressively reduces as the spring damper continues to compress and the velocity decreases. Assuming an event energy substantially greater than what can be absorbed by the spring damper alone, the spring damper eventually bottoms out, indicated at E1, at which point the remaining energy is realized as a secondary shock load that may or may not reach the EA threshold value. If a secondary shock load does reach the EA threshold value, the load will then stay at that value until the remaining energy is completely absorbed, or until the EA component is fully collapsed.

Referring again to FIG. 4, at the same seat closing velocity of 200 in/sec., increasing the damping coefficient from 6 (line S1) to 12 (line S2) gives a spring damper damping force of 2400 lbs., substantially above the 2000 lb. EA threshold value. However, the spring damper load cannot reach 2400 lbs. because deformation of the EA component would prevent that from occurring, limiting the spring damper load to the EA threshold value. Therefore the spring damper load would ramp up to the 2000 lb. threshold load, and then level off at that value.

The spring damper velocity (excluding the EA component) is determined by the force-velocity relationship of line S2, with only one velocity for any force value. The velocity required to maintain the 2000 lb. threshold load is then defined by the intersection of line S2 with the threshold load line, indicated at point "B" on FIG. 4. The spring damper velocity at intersection point B is then 2000/12 or 167 in/sec. Because the spring damper and EA component together are compressing at the initial closing velocity, that total compression velocity of 200 in/sec is the sum of the spring damper and EA component velocities. The initial compression velocity of just the EA component is therefore the difference between the initial seat and spring damper velocities, or 33 in/sec. Thus the EA component effectively maintains the spring damper velocity at the value corresponding to the intersection of the reaction force line with EA threshold line for any initial seat closing velocity greater than that value.

The seat will continue to stroke at the 2000 lb. threshold load value, and the EA component will continue to permanently deform, while the seat velocity steadily decreases from the initial value of 200 in/sec. If the seat continues to stroke until the velocity reaches 167 in/sec, deformation of the EA components will stop, whether the EA components are fully collapsed or not. After that, any further stroking of the seat will be the result of spring damper compression only. Thus, for a given event energy and initial seat velocity, the compression behavior of the seat support assembly may be selectively changed from spring damper compression only, to compression of both the spring damper and EA component, just by varying the damping coefficient c.

The spring damper behavior of the above example is also shown in FIG. 5 at line L2. The spring damper force ramps up quickly with onset of the initial closing velocity, until reaching the threshold load at point D2, and then leveling off at that value. The force continues at the threshold level for as long as the seat velocity is above 167 in/sec., during which time the spring damper compresses at 167 in/sec, and the EA component compresses at a velocity steadily decreasing from the initial 33 in/sec. Once the seat velocity (or in other words the combined spring damper and EA component velocity) drops to 167 in/sec (point D3), deformation of the EA component stops, and any remaining compression is due to the spring damper only. The reaction force drops rapidly from that point as the velocity decreases. The total seat deflection is a combination of the EA component and spring damper compression distances, and because of the relative compression velocities of the EA component and spring damper in this example, a majority of seat deflection is from compression of the spring damper. Again assuming substantially more event energy than what can be absorbed by this configuration, the spring damper will bottom out at E2, and spike up as a secondary shock load that may or may not trigger further deformation of the EA component.

The selection of a damping coefficient can also be used to affect the relative compression velocities, and the relative amounts of energy absorbed by the spring damper and EA component. For example, it may be desirable to maximize the amount of energy absorbed by the EA components and minimize the amount absorbed by the spring damper during an impact event. Referring again to FIG. 4 and continuing with the 200 in/sec initial closing velocity example, at a damping coefficient c of 48 (line S3), the spring damper compression velocity is 42 in/sec, corresponding to intersection point "C". The initial compression velocity of the EA component is then 200 minus 42, or 158 in/sec. Thus, the EA component will collapse at an initial rate approximately four times that of the spring damper. If the compression stroke lengths of the spring damper and the EA component are the same, the spring damper will have completed only about a fourth of a stroke when the EA component has fully collapsed, with most of the total absorbed energy at that point having been absorbed by the EA component.

The corresponding seat support assembly behavior is shown as line L3 in FIG. 5. The spring damper force ramps up even more quickly with onset of the initial closing velocity, until again leveling off at the threshold load at point D4. The force stays at the threshold level while the spring damper compresses at 42 in/sec, and the EA component decelerates from an initial compression velocity of 158 in/sec. Once the seat velocity drops to 42 in/sec, indicated at point D5, deformation of the EA component stops, and any remaining compression is due to the spring damper only.

The ratio of the area under the force-displacement curves of FIG. 5 to the product of peak displacement and peak force is a measure of the energy absorption efficiency of the system; and the most energy efficient system is one in which the force instantly ramps up to a peak, and remains at that peak value for the entire stroke. As can be seen from the three load-displacement curves shown FIG. 5, the area under the curves becomes progressively more like the ideal rectangular shape going from line L1 to Line L3. As shown above, this efficiency increase is due to increasing the damping coefficient relative to the EA threshold load, and consequently increasing the proportion of event energy that is absorbed by the EA component relative to the spring damper.

Thus, the inventors have discovered that for a given impact event initial closing velocity and EA threshold load, the energy absorption efficiency of the seat support assembly may be increased by simply increasing the damping coefficient. In a typical hydraulic strut this accomplished by decreasing the diameter and/or increasing the length of the hydraulic fluid orifice in the piston. In one exemplary embodiment, the damping coefficient is selected to produce an EA component to spring damper initial compression velocity ratio of at least 1, and in another embodiment an EA component to spring damper initial compression velocity ratio of at least 4. In still another embodiment, the damping coefficient is selected to produce an EA component to spring damper initial compression velocity ratio in the range of about 2 to 8.

As discussed previously, impact event conditions are not the only consideration when selecting the spring damper design parameters. A damping value that provides a desired level of energy absorption efficiency during an impact event may result in an insufficient level of vibration isolation or a severely overdamped condition during normal vehicle operation. The selection of strut damping characteristics may therefore be a compromise, giving acceptable but not necessarily optimal performance in both operating regimes.

Example 1

In a first example the seating system design parameters comprise: a combined occupant and seat weight of 240 lbs; a maximum static spring damper compression of 2.5 inches; isolation of a road-induced driving frequency $f_f$ of 3 to 20 Hz; and a damping ratio $\zeta$ between 1 and 2. For impact conditions the design parameters comprise an initial seat to vehicle closing velocity of 300 in/sec., an occupant maximum acceleration of 10 G's, and an EA component to spring damper compression velocity ratio of at least 1.0.

Using the seat weight and the allowable static displacement, the required spring rate for the spring damper is 240/2.5, or 96 lb/in. The seat natural frequency is given by $f_n=3.13\times(k/W)^{1/2}$, where "W" is combined weight in pounds, and "k" is the spring rate in pounds per inch. Substituting the above weight and spring rate values, the natural frequency is then $3.13\times(96/240)^{1/2}$, or about 2 Hz. The range of the driving frequency to natural frequency ratio then goes from approximately 3/2 to 40/2, or from 1.5 to 20, which is above the amplification to isolation transition ratio of 1.414. The spring damper will therefore act as an isolator for the given input vibration frequency range.

For the impact conditions, the required EA threshold load is 10(G's)×240=2,400 lbs. At the minimum required EA component to spring damper velocity ratio of 1.0, and an initial closing velocity of 300 in/sec, the EA component and spring damper velocities are both 150 in/sec. The required damping coefficient is determined by the spring damper velocity and the EA threshold load, where c=2400/150, or 16.

The damping ratio is given by the equation $\zeta=9.83*c/\sqrt{Wk}$, and substituting gives: $9.83*16/\sqrt{240*96}$, or a value of 1.04, meeting the requirement of a damping ratio between 1 and 2.

Example 2

In another example, the given design parameters from Example 1 above are unchanged, with the exception of the EA component to spring damper compression velocity ratio which is increased from 1 to 2 for improved energy absorption efficiency during an impact event.

If the spring damper velocity is $V_s$, the initial EA compression velocity is $2 V_s$, and the initial closing velocity is $V_s+2 V_s$, or $3 V_s$. Solving for $V_s$, the spring damper velocity is then 300/3, or 100 in/sec. The required damping coefficient becomes 2400/100, or 24, and the damping ratio $\zeta$ is $9.83*24/\sqrt{240*96}$, or a value of 1.55, still meeting the requirement of a damping ratio between 1 and 2.

The spring stiffness and natural frequency calculations are independent of damping. The driving frequency to natural frequency ratio will therefore be unchanged from Example 1, and the system will continue to function as a vibration isolator during normal operating conditions.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. For example, instead of being positioned behind and extending away from the back of the seat, the mounting system 1 could instead extend from a side of the seat to an adjacent vehicle compartment side wall or column. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed is:

1. A shock absorbing vehicle seating system, comprising:
a seat moveably attached to the vehicle by a seat guide apparatus configured to constrain seat movement to a stroking direction;
a spring damper with a first end and a second end; the spring damper configured to compress and extend along a longitudinal axis extending through the first and second ends in response to variations in loading applied at the first and second ends; and
an energy attenuating component with a deformable portion disposed between a first end and a second end thereof, the energy attenuating component configured to deform along a longitudinal axis extending through the first and second ends of the energy attenuating component, wherein the second end of the energy attenuating component is attached to the first end of the spring damper, and the longitudinal axes of the spring damper and the energy attenuating component are aligned, the spring damper and energy attenuating component together forming a seat supporting assembly disposed between the seat and the vehicle, and wherein the energy attenuating component is configured to remain rigid while shock loads imparted to the seat through the seat supporting assembly are less than a predetermined threshold value, and to permanently deform in a predictable manner in response to a shock load that reaches the threshold value, allowing the seat to stroke in the stroking direction as the energy attenuating component absorbs energy, and further wherein the spring damper has a damping coefficient selected to ensure that for a given range of seat-to-vehicle initial closing velocity in a high energy impact event, the energy attenuating component will begin to deform before the spring damper has fully compressed.

2. The seating system of claim 1, wherein the spring damper has a spring rate selected to ensure that for a given range of seat and occupant combined weight, and a given range of input vibration frequency, the spring damper acts as a vibration isolator.

3. The seating system of claim 2, wherein the spring damper has a damping coefficient selected to ensure that the damping ratio is at least one.

4. The seating system of claim 3, wherein the damping coefficient is further selected to ensure there is no input vibratory displacement amplification at a resonant condition.

5. The seating system of claim 1, wherein the damping coefficient is further selected to ensure that an initial compression velocity of the energy attenuating component is equal to or greater than an initial compression velocity of the spring damper in a given high energy impact event condition.

6. The seating system of claim 1, wherein the energy attenuating component comprises a deformable metal bar with first and second integral end flanges, the deformable metal bar formed in a sideways letter "V" shape with straight sections extending between angle bends at the middle and at the ends, thereby defining an acute angle side and an obtuse angle side of the metal bar.

7. The seating system of claim 6, wherein the energy attenuating component comprises two bookmatched sideways letter V-shaped metal bars integrally formed between the first and second end flanges, the metal bars oriented with the acute angle sides of the metal bars facing one another.

8. The seating system of claim 6, wherein the energy attenuating component comprises a pair of deformable metal bars adjacent one another.

9. The seating system of claim 6, wherein the spring damper comprises a coil spring concentrically disposed about an exterior surface of a hydraulic damper.

10. A shock absorbing vehicle seating system, comprising:
a seat moveably attached to the vehicle by a seat guide apparatus configured to constrain seat movement to a stroking direction;
a spring damper with a first end and a second end, and configured to compress along a longitudinal axis extending through the first and second ends in response to an external compressive load applied at the first and second ends; and
an energy attenuating component with a deformable portion disposed between a first end and a second end thereof, the energy attenuating component configured to deform along a longitudinal axis extending through the first and second ends of the energy attenuating component, wherein the spring damper and energy attenuating component are arranged serially with respect to one another, together forming a seat supporting assembly disposed between the seat and the vehicle, and wherein the energy attenuating component is configured to remain rigid while shock loads imparted to the seat through the seat supporting assembly are less than a predetermined threshold value, and to permanently deform in a predictable manner in response to a shock load that reaches the threshold value, allowing the seat to stroke in the stroking direction as the energy attenuating component absorbs energy, and further wherein the spring damper has a damping coefficient selected to ensure that for a given range of seat-to-vehicle initial closing velocity in a high energy impact event, the threshold load will be reached before the spring damper has fully compressed.

11. The vehicle seating system of claim 10, wherein the second end of the energy attenuating component is attached to the first end of the spring damper, and the longitudinal axes of the spring damper and the energy attenuating component are aligned.

12. The vehicle seating system of claim 10, wherein the spring damper has a spring rate selected to ensure that for a given range of seat and occupant combined weight, and a given range of input vibration frequency, the spring damper acts as a vibration isolator.

13. The vehicle seating system of claim 12, wherein the spring damper has a damping coefficient selected to ensure that the damping ratio is at least one.

14. The vehicle seating system of claim 13, wherein the damping coefficient is further selected to ensure there is no input vibratory displacement amplification at any ratio of input vibratory frequency to system natural frequency.

15. The vehicle seating system of claim 10, wherein the damping coefficient is further selected to ensure that for a given seat to vehicle initial closing velocity range associated with a given range of high energy impact events, an initial compression velocity of the energy attenuating component is equal to or greater than an initial compression velocity of the spring damper.

16. The vehicle seating system of claim 10, wherein the energy attenuating component comprises a deformable metal bar with first and second integral end flanges.

17. The vehicle seating system of claim 16, wherein the deformable metal bar is formed in a sideways letter "V" shape with straight sections extending between angle bends at the middle and at the ends, thereby defining an acute angle side and an obtuse angle side of the metal bar.

18. The seating system of claim 17, wherein the energy attenuating component comprises two bookmatched sideways letter V-shaped metal bars integrally formed between the first and second end flanges, the metal bars oriented with the acute angle sides of the metal bars facing one another.

* * * * *